United States Patent Office 2,837,768
Patented June 10, 1958

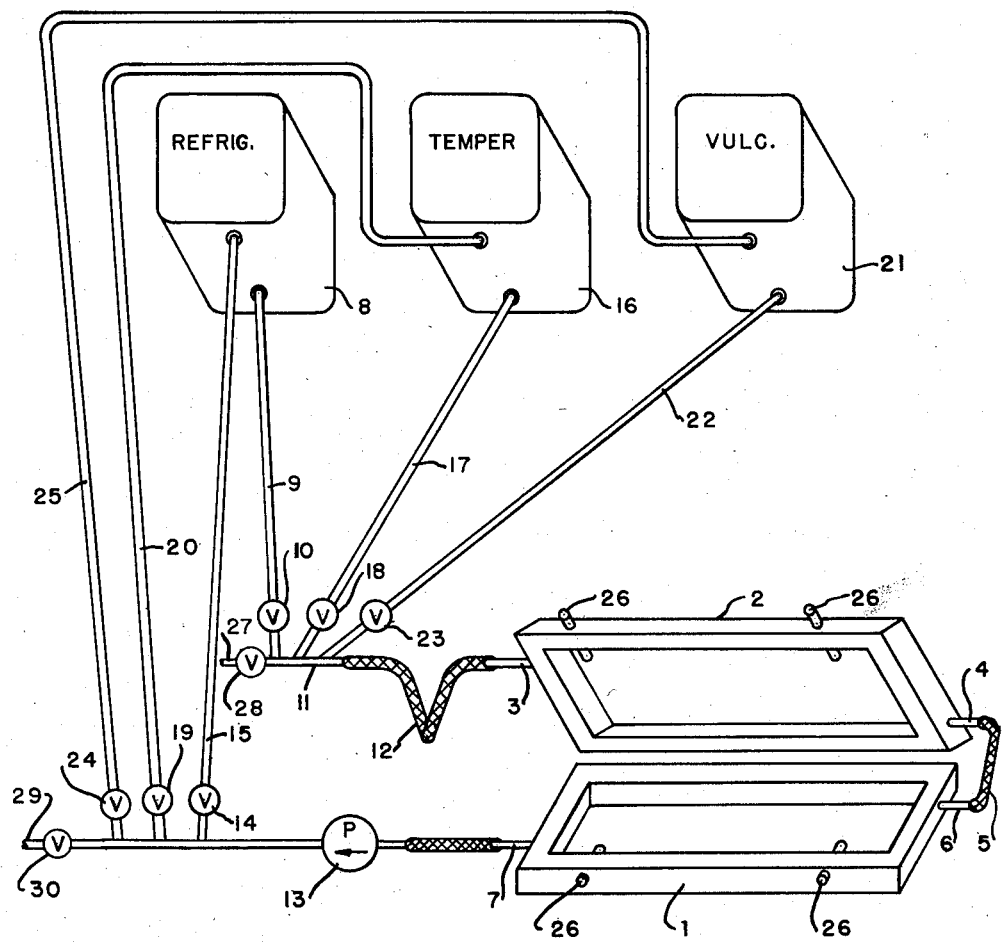

2,837,768

METHOD FOR THE MANUFACTURE OF FOAM RUBBER

Anselm Talalay, New Haven, Conn., assignor, by direct and mesne assignments, of one-half to The Dayton Rubber Company, Dayton, Ohio, a corporation of Ohio, and one-half to The B. F. Goodrich Company, Akron, Ohio, a corporation of New York Application September 2, 1950, Serial No. 182,989

8 Claims. (Cl. 18—53)

The present invention relates to a method for the manufacture of foam rubber. It relates further to a method for the manufacture of foam rubber in which successive freezing and vulcanization steps are involved.

Latex foam rubber is the name now commonly applied to products manufactured from aqueous dispersions of rubber by first forming this dispersion into a foam and thereafter coagulating and vulcanizing this foam to form a spongy resilient type of sponge rubber having desirable properties.

In one method commonly used for the manufacture of foam rubber, latex is caused to foam by whipping or beating. Either before or during the whipping operation a delayed action coagulant is incorporated in the latex and the foam thus produced is introduced into a mold prior to coagulation. The coagulation is then completed in the mold and the coagulating material is subjected to vulcanization to form the final product which is removed from the mold, washed, and dried.

In a more recent method as described and claimed in the patent to Talalay 2,432,353, the foam is introduced into a mold without a chemical coagulant and is frozen without irreversible coagulation to the solid state. It was found that the resulting frozen mass was stereoreticulate, or in other words, was composed of a cellular mass in which the cells were in communication with each other. Coagulation could thus be effected by introducing into the mass a fluid coagulant which became disseminated through the communicating cells. In this way coagulation was obtained with the foam in a frozen state, thus avoiding any collapse of cell structure and obviating the necessity for the incorporation of an internal chemical coagulant. The coagulated material is then thawed and vulcanized. All of these operations could be carried out in the mold by successively immersing the closed mold in a refrigeration bath, and then after coagulation, in a vulcanizing bath. Instead, the process could be carried out by utilizing jacketed molds or molds provided with heat exchange tubes located in the surfaces thereof and circulating the refrigerating and vulcanizing fluids through the molds while they are maintained in a stationary position.

In the operation of the Talalay process it is important to efficiently carry out the heat exchange in the various stages of the process and to conserve as much energy in the form of heat or cold, or both, as possible. It is also preferable to avoid intermixing of the heat exchange fluids, or their contamination or dilution with each other, or with external fluids. Furthermore, it has been found to be undesirable to introduce the latex composition into a mold which is at an elevated temperature as the result of the previous vulcanization step. In addition, it has been found to be undesirable to directly subject the refrigerated mold which is at a low temperature from the freezing step to the elevated temperatures necessary for vulcanization.

It is therefore an object of the present invention to provide a method for the manufacture of foam rubber products by a process which involves successive freezing and vulcanization of the foam in which an efficient manner of heat exchange is utilized.

In accordance with the present invention, it has been found that the molds in which the foam is to be formed may be provided with indirect heat exchange means associated with the surfaces thereof. Through this heat exchange means is circulated a refrigerated medium at a suitably low temperature for effecting freezing of the foam. Coagulation is then effected by introducing a coagulating fluid into the mold and permeating the frozen mass. Following the freezing and coagulation steps, a tempering medium which is at a temperature intermediate that required for refrigeration and that required for vulcanization, preferably at approximately room temperature, is circulated through the heat exchange means. In this way the temperature of the mold and its contents is increased to a point approaching room temperature at the same time a certain amount of the cold is stored in the tempering fluid.

Following the tempering step, a vulcanizing fluid at vulcanizing temperatures is circulated through the heat exchange means for a period of time sufficient to effect vulcanization of the material. Since the mold must be promptly utilized in a succeeding cycle and since it is desirable that the temperature of this mold be reduced as quickly as possible to approximately room temperature, the same tempering fluid which has been used following the refrigeration step is now used for reducing the temperature of the hot mold to the desired point. The cold which has been stored in this fluid from the tempering following refrigeration is now balanced, to a certain extent at least, by the heat of vulcanization which is removed from the mold.

The process will now be described in detail with reference being made to the accompanying drawings which illustrate diagrammatically a system of the type in question.

In the drawing, 1 and 2 are the bottom and top halves respectively of a mold for making foam rubber. The mold may, of course, be of any desired shape and may possess any desired number of cavities and is shown as a simple two part mold for purposes of illustration only. Each half of the mold has an indirect heat exchange jacket or chamber associated therewith. The heat exchange means may be in the form of sets of parallel tubes embedded or incorporated in the top and bottom surfaces of the mold, or may be in the form of hollow chambers with or without baffles or the like. The heat exchange means may also be in the form of a single tube or conduit extending back and forth across the bottom or top surface of the mold as the case may be, in serpentine fashion. For purposes of illustration, the mold is shown with an inlet 3 and outlet 4 in the top half of the mold and an inlet 6 and outlet 7 in the bottom half of the mold. The heat exchange means of the two halves are connected in a series by means of a flexible tubing 5. The outlet 7 is connected to the intake of pump 13. In the operation of the process and apparatus the latex composition which may have been foamed externally of the mold or may contain a foaming agent which will permit formation of the foam after the mold is closed, is introduced into the bottom half of mold 1 and the top half of mold 2 is then closed. The refrigerant fluid which is contained in tank 8 and which for purposes of illustration may consist of a mixture of ethylene glycol and water is connected to the pump by closing valves 18, 19, 23 and 24 and opening valves 10 and 14. The refrigerant which may be at a temperature of about $-20°$ to $-30°$ C. and which has been chilled in a refrigerating unit (not shown), is drawn from the tank through line 9 valve 10 and lines 11 and 12 into inlet 3 through the upper half of the mold and then through the lower half of the mold through lines 4, 5, and 6 and outlet 7. The return refrigerant is pumped through valve 14 and line 15 back into the tank and this circulation continues until the foam within the mold has been frozen, which in the case of an average object like a pillow or seat cushion, may be of the order of fifteen to thirty minutes. When the foam has been frozen the pump is shut off and the coagulant is introduced into the closed mold through the nipples 26. Preferably the coagulant is a gas, such as $CO_2$, and is introduced under a slight pressure so that it will diffuse through the cells of the frozen mass. The introduction of the coagulant is continued until the gas begins to escape through the back of the mold, or for five to ten minutes. Valves 10 and 14 have in the meantime been closed and valves 18 and 19 have been opened. The pump is then placed in operation and draws tempering fluid from tank 16. This fluid is preferably of the same composition as the refrigerant and is preferably at or near room temperature. This tempering fluid is drawn through line 7 valve 18, lines 11 and 12 and inlet 3 through both halves of the mold and then pumped through valve 19 and line 20 back into tank 16. This circulation continues until the temperature of the mold and the product have been increased to a point near or above the thawing temperature and preferably within the range of about 0 to 20° C. This may require two to ten minutes for a product of ordinary size as above mentioned. At this point valves 18 and 19 are closed and valves 23 and 24 are opened. This permits vulcanizing fluid to be drawn from tank 21. This fluid may for purposes of example be of the same composition as that in tanks 8 and 16; namely, ethylene glycol and water, and is at a vulcanizing temperature usually between 120° C. and 135° C. This fluid circulates through line 22 valve 23 and through both halves of the mold in the manner described above and returns to the tank through valve 24 and line 25. The circulation of this hot fluid continues until vulcanization is completed which for objects of ordinary size, such as pillows or seat cushions, may require about ten to thirty minutes. At this point the mold and its contents are at an elevated temperature and it is necessary that this temperature be reduced to facilitate stripping of the product and to make the mold ready for a succeeding cycle at a lower temperature. Valves 23 and 24 are therefore closed again and valves 18 and 19 are opened again. This permits the tempering fluid to recirculate through the mold in order to reduce the temperature to the desired point for handling. Generally this may be between about 30° to 70° C.

It is generally preferred to utilize a fluid of uniform or identical composition throughout in order to avoid intermixing and contamination of the fluids. Such fluids are, for example, ethylene glycol and water, substantially anhydrous butyl carbitol, and the like. Refrigerant tank 8 is, of course, connected to a refrigerating unit through which the refrigerant is recirculated in order to maintain it at the proper temperature. Tempering tank 16 is also connected to a heat exchanger through which the tempering fluid is recirculated in order to maintain the proper temperature. Ordinarily there is a tendency for the temperature of the tempering fluid to build up due to the fact that the heat of vulcanization which is picked up is in excess of the heat loss during tempering after the freezing step. This tendency may be balanced by recirculating some of the tempering fluid through a chiller. The vulcanizer is connected to the heat exchanger through which the vulcanizing fluid recirculates in order to maintain it at vulcanizing temperature. In some cases it may be desired to utilize different fluids for refrigeration, tempering and vulcanization. For example, the refrigerant may be alcohol, an alcohol-water mixture, or brine, the vulcanizing fluid may be hot water or steam, and the tempering fluid may be water at room temperature or thereabouts. In this case it would be necessary to purge the system between each step in the cycle in order to remove the fluid used in that step. This may be accomplished by using either air nitrogen or other desired fluids as a purging material introduced through line 27 and valve 28 and removed through line 29 and valve 30, the other valves being closed. In some cases it may be desirable to eliminate either the intermediate or final tempering steps in order to reduce the overall length of the cycle. This is particularly true for the intermediate cycle where cheap steam is available.

The foregoing method is also applicable where the mold is immersed into a tank containing refrigerating fluid to effect freezing, into another tank containing tempering fluid, then into a vulcanizing chamber in contact with hot water, hot air, or steam and then into another tempering bath or zone to effect temperature reduction. In this case, of course, indirect heat exchange means need not be provided in the mold.

The term "aqueous rubber dispersion" as used herein is intended to include any water dispersion of natural rubber or synthetic rubber-like materials or elastomers known to the art, such as the conjugated diolefine polymers and their copolymers with monomers copolymerizable therewith having an ethylenic double bond, the polyhaloprenes, the isoprene-diolefine polymers, etc., for example butadiene-styrene copolymers (Buna–S or GR–S), butadiene-acrylic nitrile copolymers (Buna–N or GR–A) polychloroprene (neoprene).

Where the same fluid is used for refrigerating, tempering and vulcanization, liquids are selected having good heat carrying properties and low corrosivity to the mold. Ethylene glycol-water mixtures have been found to be highly suitable. A solution of 60% ethylene glycol and 40% water has been found to function satisfactorily and does not have too high a viscosity at the low freezing temperatures required. Anhydrous butyl carbitol and other carbitols and glycols having a suitable boiling range and viscosity characteristics at freezing and vulcanizing temperatures may also be used. Where separate fluids are used, alcohol-water mixtures may be used for refrigeration, and water alone for tempering and vulcanization. Other fluids may be selected in accordance with the principles set forth above.

I claim:

1. A method for the manufacture of foam rubber which comprises incorporating a foamed aqueous rubber dispersion within a mold, circulating a refrigerant fluid at a temperature below the freezing point of the foam through the mold in indirect heat exchange with the contents thereof until the foam is frozen, introducing a coagulant into the frozen mass to effect coagulation of said foam while still in a frozen state, circulating a tempering fluid through the mold in indirect heat exchange with the contents thereof at a temperature above the freezing point of the latex and below the vulcanization temperature to at least partially thaw the frozen mass and increase the temperature of the mold and its contents, and then circulating a fluid through said mold in indirect heat exchange with the contents thereof and at vulcanizing temperatures to effect vulcanization of the foam.

2. A method according to claim 1 wherein a tempering fluid is circulated through the mold in indirect heat exchange with the contents thereof following the vulcanization step to reduce the temperature of the mold and the contents thereof prior to removal of the product from the mold and preparatory to reuse of the mold in another cycle.

3. A method according to claim 2 wherein the fluids utilized in the freezing, tempering, and vulcanizing steps are each respectively recirculated to separate sources of supply, and wherein the tempering fluid which has been used following the freezing step is also used following the vulcanization step.

4. A method according to claim 2 wherein the fluids utilized in the freezing, tempering, and vulcanizing steps are of the same composition.

5. A method according to claim 4 wherein the fluid is a solution of ethylene glycol and water.

6. A method according to claim 4 wherein the solution is substantially anhydrous butyl carbitol.

7. A method for the manufacture of foam rubber which comprises incorporating a foamed aqueous rubber dispersion within a mold, circulating a refrigerant fluid at a temperature below the freezing point of the foam through the mold in indirect heat exchange with the contents thereof until the foam is frozen, introducing a coagulant into the frozen mass to effect coagulation of said foam while still in a frozen state, discontinuing circulation of the refrigerant fluid and purging residual fluid from the mold, circulating a tempering fluid through the mold in indirect heat exchange with the contents thereof at a temperature above the freezing point of the latex and below the vulcanization temperature to at least partially thaw the frozen mass and increase the temperature of the mold and its contents, discontinuing flow of the tempering fluid and purging residual tempering fluid from the mold, and then circulating a vulcanizing fluid through said mold in indirect heat exchange with the contents thereof and at vulcanizing temperatures to effect vulcanization of the foam, discontinuing flow of said vulcanizing fluid, and purging residual vulcanizing fluid from said mold.

8. A method according to claim 7 wherein a tempering fluid is circulated through the mold in indirect heat exchange with the contents thereof following the last named purging step to reduce the temperature of the mold and the contents thereof prior to removal of the product from the mold and preparatory to reuse of the mold in another cycle.

References Cited in the file of this patent

UNITED STATES PATENTS

| | | |
|---|---|---|
| 1,630,921 | Snelling | May 31, 1937 |
| 2,173,588 | Mahler | Sept. 19, 1939 |
| 2,308,970 | Carter | Jan. 19, 1943 |
| 2,342,920 | Clark | Feb. 29, 1944 |
| 2,350,175 | Luxenberger | May 30, 1944 |
| 2,432,353 | Talalay | Dec. 9, 1947 |
| 2,441,235 | Blair et al. | May 11, 1948 |
| 2,476,827 | Wohler et al. | July 19, 1949 |